US012399850B2

(12) United States Patent
Ng et al.

(10) Patent No.: US 12,399,850 B2
(45) Date of Patent: Aug. 26, 2025

(54) SECURE DIRECT MEMORY ACCESS

(71) Applicants: ATI TECHNOLOGIES ULC, Markham (CA); ADVANCED MICRO DEVICES, INC., Santa Clara, CA (US)

(72) Inventors: Philip Ng, Toronto (CA); Nippon Raval, Markham (CA); Jeremy W. Powell, Austin, TX (US); Donald Matthews, Jr., Ft. Collins, CO (US); David Kaplan, Austin, TX (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 49 days.

(21) Appl. No.: 18/090,601

(22) Filed: Dec. 29, 2022

(65) Prior Publication Data

US 2024/0220429 A1 Jul. 4, 2024

(51) Int. Cl.
*G06F 13/28* (2006.01)
*G06F 9/455* (2018.01)
*G06F 21/57* (2013.01)

(52) U.S. Cl.
CPC .......... *G06F 13/28* (2013.01); *G06F 9/45558* (2013.01); *G06F 21/57* (2013.01); *G06F 2009/45579* (2013.01); *G06F 2009/45587* (2013.01)

(58) Field of Classification Search
CPC ...... G06F 13/28; G06F 9/45558; G06F 21/57; G06F 2009/45579; G06F 2009/45587

USPC .......................................................... 710/22
See application file for complete search history.

(56) References Cited

U.S. PATENT DOCUMENTS

| | | | | |
|---|---|---|---|---|
| 2013/0080726 | A1* | 3/2013 | Kegel | G06F 21/85 711/163 |
| 2014/0173236 | A1* | 6/2014 | Kegel | G06F 12/1441 711/163 |
| 2015/0248357 | A1* | 9/2015 | Kaplan | G06F 12/1408 713/193 |
| 2017/0090968 | A1 | 3/2017 | Tsirkin et al. | |
| 2018/0095900 | A1* | 4/2018 | Sarangdhar | G06F 13/1668 |
| 2018/0107608 | A1* | 4/2018 | Kaplan | G06F 12/1466 |
| 2018/0189190 | A1* | 7/2018 | Kaplan | G06F 9/45545 |
| 2018/0232320 | A1 | 8/2018 | Raval et al. | |
| 2019/0354387 | A1 | 11/2019 | Zhou et al. | |

(Continued)

FOREIGN PATENT DOCUMENTS

CN 109558211 4/2019

OTHER PUBLICATIONS

International Search Report and Written Opinion issued in Application No. PCT/US2023/085132, mailed Apr. 24, 2024, 12 pages.

*Primary Examiner* — Christopher B Shin

(57) ABSTRACT

A processor supports managing DMA accesses, in secure fashion, at an IOMMU. The IOMMU is configured to ensure that, for a given DMA request issued by an I/O device and associated with a particular executing VM, the device is bound to the VM according to a specified security registration process, and the request is targeted to a region of memory that has been assigned to the VM. The IOMMU thus prevents a malicious entity from accessing confidential information of a VM via DMA requests.

18 Claims, 4 Drawing Sheets

(56) References Cited

U.S. PATENT DOCUMENTS

2020/0133878 A1    4/2020  Asaro et al.
2023/0403260 A1*  12/2023  Hausauer ............. H04L 49/901

* cited by examiner

SECURE DIRECT MEMORY ACCESS

BACKGROUND

In a confidential computing environment, a processing system (e.g., a server) executes multiple software programs, such as virtual machines and a virtual machine manager (e.g., a hypervisor), wherein different software programs are owned by different entities. For example, in some confidential computing environments, different virtual machines executed by the environment are owned by different companies. A virtual machine manager (e.g., a hypervisor) controls the scheduling of the different virtual machines for execution and provides an interface between the virtual machines and the server hardware, so that each virtual machine (VM) is able to operate as if that VM were executing on its own dedicated hardware.

Because the different VMs are often owned by different entities, some confidential computing systems support security features that prevent one VM from accessing the data or other information associated with another VM. However, in some cases the confidential information of a VM is accessible via input/output devices that interact with the VM.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
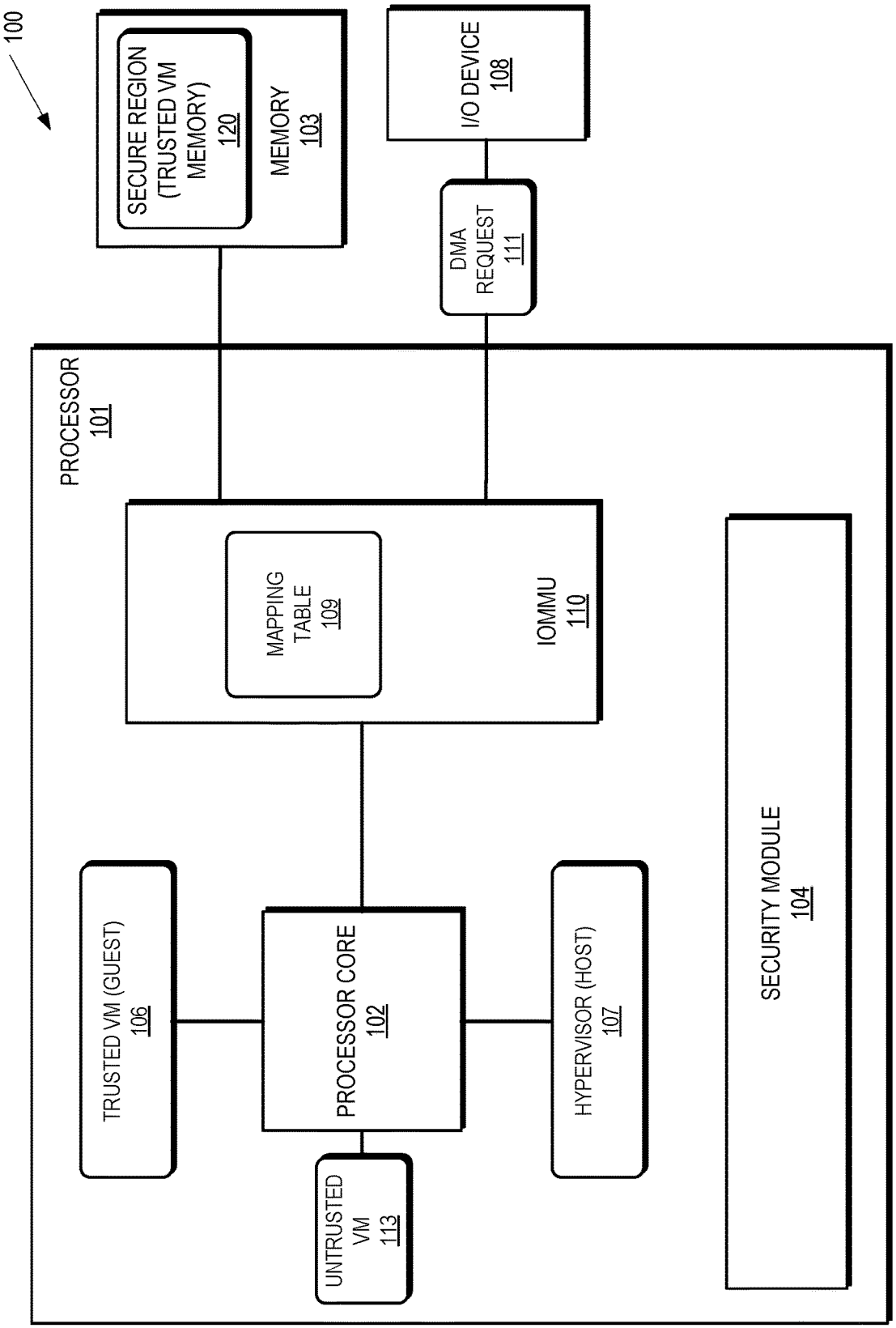
FIG. 1 is a block diagram of a processing system that employs an input/output memory management unit (IOMMU) to manage secure direct memory access (DMA) to memory in accordance with some embodiments.

FIGS. 1-6 illustrate techniques for managing DMA accesses, in secure fashion, at an IOMMU of a processing system in accordance with some embodiments. The IOMMU is configured to ensure that, for a given DMA request issued by an I/O device and associated with a particular executing VM, the device is bound to the VM according to a specified security registration process, and the request is targeted to a region of memory that has been assigned to the VM. The IOMMU thus prevents a malicious entity from accessing confidential information of a VM via DMA requests.

To illustrate further via an example, in some processing systems I/O devices are permitted to issue DMA requests, wherein each DMA request identifies a region of memory from which data is to be read, a region of memory to which data is to be written, or a combination thereof. To enhance processing efficiency an IOMMU of the processing system translates addresses for the DMA requests, translating virtual addresses to system physical addresses, rather than performing the address translation at a memory controller or central processing unit (CPU) of the processing system. However, in at least some cases the DMA requests render secure data of the processing system vulnerable to unauthorized access or modification. For example, a malicious entity could employ a DMA request to read data from a region of memory assigned to an executing VM, thereby accessing confidential information. As another example, the malicious entity could employ a DMA request to write data to the region of memory assigned to the executing VM, requiring the VM to take remedial action that exposes the behavior of the VM to unauthorized examination.

To prevent these and similar attacks by a malicious entity, a processing system, using the techniques described herein, employs an IOMMU to ensure that each DMA request associated with a VM is issued by an I/O device that is trusted by the VM, and that each DMA request targets a region of memory that has been assigned to the VM. For example, in some embodiments, a security module (e.g., a security co-processor) of the processing system implements a specified device binding process (e.g., a Trusted Execution Environment (TEE) Device Interface Secure Protocol (TDISP) process) that binds an I/O device to a VM. The binding process implements specified processes, such as an authentication process, that allows the VM to "trust" the I/O device—that is, to assume that the operations of the I/O device are secure and unlikely to result in exposure of confidential VM information. A VM that has been bound (that is, has undergone the binding process) are sometimes referred to herein as a Trusted VM (TVM) In addition, the security module assigns, to each executing TVM, a corresponding region of memory where the TVM is exclusively permitted to store data, and constructs a mapping table entry that associates the TVM with a device and with the corresponding region of memory.

In response to receiving a DMA request from an I/O device, the IOMMU performs device validation by ensuring the I/O device is bound to a TVM using the mapping table. Upon successful I/O device validation. the IOMMU determines, based on the mapping table, whether the DMA request targets the region of memory that is assigned to the TVM. If not, the IOMMU prevents execution of the DMA request as described herein. If the region of memory targeted by the DMA request is assigned to the VM, the IOMMU executes the DMA request. Thus, using the techniques described herein, an IOMMU prevents execution of DMA requests on behalf of a VM when the requesting I/O device is not bound to the VM, or when the DMA request targets a region of memory that is not assigned to the VM. The IOMMU thus prevents unauthorized access to, or modification of confidential information associated with a VM. Further, because these security operations are performed by the IOMMU itself, it is difficult for a hypervisor or other entity to interfere with those operations, thus supporting secure DMA accesses in confidential computing environments. These security operations allow for the hypervisor and other administrative entities to be outside of the trusted compute boundary (TCB) of the TVM. Thus, the TVM does not have to trust the hypervisor and other administrative entities, but instead is able to rely on the IOMMU-based protection mechanisms described herein to prevent unauthorized access or modification of trusted VM memory.

FIG. 1 illustrates a processing system 100 that implements a programmable SMT protection mode in accordance with some embodiments. The processing system 100 is generally configured to execute sets of instructions (e.g., computer programs) to carry out tasks on behalf of an electronic device. Accordingly, in different embodiments the processing system 100 is part of any of a variety of electronic devices. For purposes of description, it is assumed that the processing system 100 is part of an electronic device that implements a confidential computing environment, such as a server. However, in other embodiments, the processing system 100 is part of a desktop computer, laptop computer, tablet, game console, and the like.

To implement the confidential computing environment, and to execute the sets of instructions and corresponding operations, the processing system 100 includes a processor 101, a memory 103, and one or more input/output (I/O) devices, such as I/O device 108. In some embodiments, the processor 101 is a general-purpose processor, such as a central processing unit (CPU) including hardware structures configured to retrieve and execute the sets of instructions. The memory 103 includes one or more memory devices configured to store and retrieve data based on commands (e.g., store and load commands) received from the processor 101. Accordingly, in different embodiments the memory 103 is random access memory (RAM), non-volatile memory (NVM), hard disc memory, and the like, or any combination thereof.

The I/O device 108 is any device that can, independent of the processor 101, process input information, output information, or a combination thereof on behalf of the processing system 100. For example, in some embodiments the I/O device 108 is a network interface device that processes input and output information for a network (not shown) connected to the processing system 100. In other embodiments, the I/O device 108 is a storage controller (e.g., a disc controller or non-volatile memory (NVM) storage controller), a controller associated with a user interface (e.g., a keyboard), and the like.

To execute the sets of instructions and corresponding operations, the processor 101 includes a processor core 102, a security module 104, and an input/output memory management unit 110. It will be appreciated that in some embodiments the processor 101 includes additional hardware to execute instructions, and to execute operations based on those instructions, such as additional processor cores, additional processing units (e.g., one or more graphics processing units), one or more controllers (e.g., memory controllers and input/output controllers), and the like.

The processor core 102 includes one or more instruction pipelines including a plurality of stages to execute instructions in a pipelined fashion. Thus, for example, in some embodiments an instruction pipeline of the processor core 102 includes a fetch stage, a decode stage, a dispatch stage, one or more execution stages (with one or more corresponding execution units), a retire stage, and the like. The processor core 102 also includes, or has access to, memory structures and other hardware (not explicitly illustrated at FIG. 1) that support execution of instructions. For example, in some embodiments the processor core 102 includes or has access to one or more cache structures to store data used for execution of the instructions.

The security module 104 is a set of hardware structures generally configured to create, monitor and maintain a security environment for the processor 101. For example, in at least some embodiments the security module 104 is configured to manage the boot process for the processor 101, initialize security related mechanisms for the processor 101, and monitoring the processing system 100 for suspicious activity or events and implement an appropriate response. In some embodiments the security module 104 includes a microcontroller, a cryptographic coprocessor (CCP) to encrypt and decrypt data, local memory and local registers to store, for example, cryptographic keys, and includes interfaces to interact with the memory 103, the I/O controller of the processor 101, and configuration registers of the processor 101. In some embodiments, the security module 104 includes Environment Management Control hardware that performs environmental and security checking to ensure that the processor 101 is operating according to specified security parameters.

In some embodiments, the security module 104 manages a device binding process, wherein an I/O device is bound to a TVM by undergoing a specified security registration process. For example, in some embodiments the TVM 106 seeks to bind the I/O device 108 by sending a binding request to the security module 104. In response, the security module 104 initiates the specified security registration process, such as by requesting authentication information (e.g., a device certificate) from the I/O device 108 and verifying the authentication information (e.g., by comparing the authentication information, or key information generated based on the authentication information, to one or more security keys). If the authentication information received from the I/O device 108 is verified, the security module 104 indicates to the TVM 106, and to other components of the processor 101 as described further herein, that the I/O device 108 is bound to the TVM 106.

It will be appreciated that, in some embodiments, an I/O device is able to be bound to multiple virtual machines by undergoing the specified security registration process for that TVM. For example, in some embodiments each virtual machine employs a different virtual function (VF) to interact with a physical I/O device, thus allowing the I/O device to be virtualized as a different virtual I/O device for each TVM. In some embodiments, the security module 104 binds an I/O device to a VM by binding the corresponding VF to the TVM, thus allowing a single physical I/O device to be bound to multiple TVMs (as long as the physical I/O device undergoes the security registration process for each TVM).

In some embodiments, an I/O device has its own translation lookaside buffer (TLB), sometimes referred to as an address translation cache (ATC) and uses an address translation service (ATS) to request address translation from the IOMMU. The I/O device is assigned to the TVM. In response to the I/O device requesting ATS, the IOMMU performs security checks, including checking that the I/O device is bound to the TVM, and that the ATS request targets a region of memory assigned to the TVM. If either of these checks fails, the IOMMU denies the ATS request If both the checks are passed, the IOMMU translates the address and returns the translated address to the I/O device, which caches the translated address at the ATC. Subsequently, the I/O device issues a DMA request using the translated address. In response, the IOMMU performs the security checks for the DMA request, using the mapping table.

As noted above, the processing system 100 is generally configured to implement a confidential computing environment, and in particular to execute a plurality of virtual machines (VMs) (e.g., TVM 106, VM 113), also referred to as guests, and a hypervisor 107, also referred to as a host, to manage execution of the plurality of VMs. In some embodiments, at least one of the VMs is a TVM (e.g., TVM 106 is a trusted VM) and at least one other of the VMs is an untrusted VM (e.g., VM 113 is an untrusted VM. Because the different VMs, and at least in some cases the hypervisor 107, are owned by different entities, the processing system 100 implements security features to protect the data of a given TVM from access by other software, such as by another VM or by the hypervisor 107, or by an I/O device assigned to an untrusted VM. For example, the processing system 100 implements data security for the TVMs by implementing a secure region 120 of the memory 103 that stores encrypted data. In particular, the processor 101 is configured to encrypt specified data for each TVM according to a corresponding private cryptographic key, and to store the encrypted data at the secure region 120. Because the data is encrypted, the data for one TVM is protected from unauthorized access by other VMs (both TVMs and untrusted VMs) and by the hypervisor 107. In at least some embodiments, cryptographic keys for the TVMs are managed by the security module 104, and data encryption and decryption for the TVMs is executed by a dedicated hardware encryption/decryption module (not shown) at a memory controller (not shown) of the processor 101.

To enhance processing efficiency, the IOMMU 110 is generally configured to perform address translation and memory protection on behalf of the processor 101—that is, to perform address translation and memory protection operations using dedicated hardware of the IOMMU 110. In particular, the IOMMU 110 includes dedicated hardware to perform memory address translation and memory protection for direct memory access (DMA) operations, wherein I/O devices (such as I/O device 108) generate DMA requests (e.g., DMA request 111) to read data from the memory 103, write data to the memory 103, or a combination thereof. In some embodiments, each DMA request includes a descriptor indicating the virtual addresses of the data to be accessed—that is, the virtual address of the data to be read, the virtual address where data is to be written, or both. These virtual addresses indicate the region of the memory 103 that is targeted by the DMA request. The IOMMU 110 is generally configured to translate the virtual addresses indicated by a DMA request to physical addresses of the memory 103, and to interact with the memory 103 to carry out the one or more operations (read operations, write operations, or a combination thereof) indicated by the DMA request.

Because the DMA requests are, at least in some cases, executed independently of the operations of the processor 101, the DMA requests provide an avenue for a malicious entity to access confidential information associated with TVMs executing at the processor 101. For example, a malicious I/O device (or an I/O device that is controlled by a malicious entity) could issue a DMA request targeting the secure region 120 of memory 103, thereby exposing confidential data of the TVM 106 to unauthorized access, or triggering behavior by the TVM 106 (e.g., to replace confidential data that has been transferred) that can in turn expose confidential information to the malicious entity.

To address these potential vulnerabilities, the security module 104 maintains a mapping table 109 that indicates, for each TVM, the I/O devices that are bound to the TVM and the region of the memory 103 that is assigned to the TVM. It will be appreciated that although the mapping table 109 is illustrated as stored at the IOMMU 110, in at least some embodiments the mapping table 109 is stored at the memory 103, and the IOMMU 110 includes one or more caches that store subsets of the entries of the mapping table 109, thereby improving performance.

In response to receiving a DMA request, the IOMMU 110 determines (e.g., based on a descriptor included with the DMA request) the TVM that is associated with the request. For example, in some embodiments each DMA request includes a VM identifier (e.g., a VMID) indicating the TVM for which the DMA request has been issued. In some embodiments, the DMA request includes a requestor identifier, indicating the I/O device that issued the DMA request. The IOMMU 110 determines, based on the mapping table 109, if the requesting I/O device is bound to the indicated TVM. If not, the IOMMU 110 prevents execution of the DMA request. For example, in some embodiments the IOMMU 110 prevents execution of the DMA request by not initiating an address translation process for the DMA request, so that the virtual addresses indicated by the DMA request are not translated to physical addresses. This prevents the DMA request from being properly executed, thereby protecting confidential information associated with the TVM.

In response to identifying that the requesting I/O device (that is the I/O device that issued the DMA request) is bound to the TVM indicated in the DMA request, the IOMMU 110 determines whether the DMA request targets a portion of the memory 103 that is within the region of memory assigned to the TVM, as indicated by the mapping table 109. To illustrate, in some embodiments, the DMA request indicates the virtual addresses that are to be read, that are to be written, or a combination thereof. The IOMMU 110 compares the virtual addresses indicated by the DMA and determines if all of the virtual addresses are within the region of memory assigned to the corresponding TVM, as indicated by the mapping table 109. If any of the virtual addresses fall outside of the TVM's assigned region, the IOMMU 110 prevents execution of the DMA request, as described above. If the virtual addresses indicated by the DMA request are within the TVM's assigned region of the memory 103, the IOMMU 110 executes the DMA request. The IOMMU 110 thus ensure that DMA requests are only satisfied if 1) the requesting device is bound to the corresponding TVM by a specified security registration process; and 2) the DMA request targets a portion of the memory 103 that is assigned to the VM. The IOMMU 110 thus prevents a malicious entity from accessing confidential VM information via a DMA request.

In some embodiments, the mapping table 109 stores physical, rather than virtual addresses, and the IOMMU first translates the virtual address indicated by the DMA request to a physical address (or set of physical addresses), and then determines if the physical address (or set of physical addresses) is within the region of memory assigned to the corresponding TVM, as indicated by the mapping table 109.

It will be appreciated that, in some embodiments, the operations of the IOMMU 110 occur in a different order than described in the above example. For example, in some embodiments the IOMMU 110 first checks whether the DMA request targets a portion of the memory 103 that is assigned to the TVM associated with the request, and if so the IOMMU 110 then checks whether the requesting device is bound to the TVM. In other embodiments, the IOMMU 110 checks both conditions (whether the requesting device is bound to the TVM and whether the DMA request targets a portion of the memory 103 assigned to the TVM) concurrently or in parallel.

Figure 2:
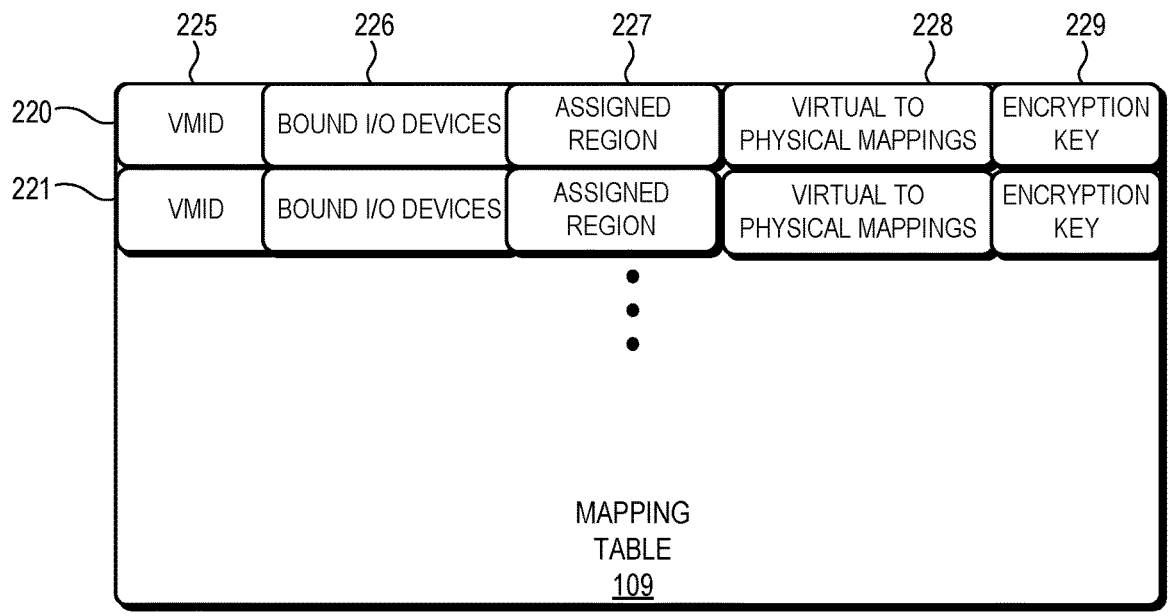
FIG. 2 is a block diagram of an example mapping table employed by the IOMMU of FIG. 1 to manage secure DMA requests in accordance with some embodiments.

FIG. 2 illustrates an example of the mapping table 109 in accordance with some embodiments. In the depicted example, the mapping table 109 includes a plurality of entries (e.g., entry 220, entry 221), wherein each entry is assigned to a different TVM, such as a TVM that is currently executing at the processor 101, a TVM that has undergone a VM provisioning process at the processing system 100 (and therefore is expected to be executed at the processing system 100 in response to a VMRUN command), and the like, or any combination thereof. It will be appreciated that, while the mapping table 109 is illustrated at FIG. 1 as a unified structure, in some embodiments one or more of the fields of the mapping table is stored in a different table or other structure.

Each entry of the mapping table 109 includes a plurality of fields, including a VM identifier field 225, a bound device field 226, an assigned memory field 227, an address mapping field 228, and an encryption key field 229. The VM identifier field 225 stores a virtual machine identifier (VMID) assigned (e.g., by the security module 104) to the VM associated with the corresponding entry. That is, the VM identifier field of an entry stores a value, referred to as a VMID, indicating the VM that corresponds to that entry.

The bound device field 226 of an entry stores a value, or set of values, indicating a different device identifier (device ID) for each I/O device that has been bound to the corresponding TVM by the security module 104. In some embodiments, in response to an I/O device successfully completing the specified security process for binding, the security module 104 updates the bound device field 226 of the corresponding entry to indicate 1) the device ID of the I/O device that has been bound; and 2) the VMID for the TVM to which the I/O device has been bound. In some embodiments, when the security module 104 modifies the mapping table 109, the secure module 104 also instructs the IOMMU 110 to invalidate IOMMU caches and to flush DMA channels.

The assigned memory field 227 indicates the portion of the memory 103 that is assigned to the corresponding VM. In some embodiments, when execution of VM is initiated (e.g., by a VMRUN command), the security module 104 determines the portion of the memory that is to be assigned to the VM, and in particular ensuring that two VMs are not assigned the same portion (or overlapping portions) of the memory 103. The security module 104 modifies the assigned memory field 227 of the corresponding entry of the mapping table 109 to indicate the assigned portion of the memory 103 (e.g., by storing a set of memory addresses indicating the assigned portion).

The address mapping field 228 stores a set of virtual-address-to-physical-address mappings for the TVM corresponding to the entry of the mapping table 109. In at least some embodiments, when executing a DMA request, the IOMMU 110 uses the address mapping field 228 to determine the physical addresses of the memory 103 to be accessed by the request. For example, in some embodiments the address mapping field stores a set of address mapping pages, and each DMA request includes a descriptor identifying the virtual addresses of the data to be read, the location of where data is to be written, or a combination thereof. When executing the DMA request, the IOMMU 110 uses the address mapping field 228 to perform a page walk based on the virtual addresses included in the DMA descriptor, thereby translating the virtual addresses to a set of physical addresses. The IOMMU 110 then uses the physical addresses to interact with the memory 103 and thereby execute the DMA request. By including the address mapping field 228 at the mapping table 109 along with the corresponding bound device field 226 and assigned memory field 227, the IOMMU is able to quickly determine whether a given DMA request is permitted to be executed and, if so, to quickly initiate the address translation process in order to execute the DMA request.

In other embodiments, the virtual address to physical address mappings are not stored at the mapping table 109 itself, but instead are stored in a set of guest and host page table structures. The IOMMU 110 translates a virtual address to a physical address using these structures. The physical address is then used by the IOMMU 110 to determine whether the corresponding DMA request targets the region of memory indicated by the assigned memory field 227.

The encryption key field 229 stores a trusted VM encryption key identifier assigned to the corresponding TVM by the secure module 104. In some embodiments, the IOMMU 110 tags each successful DMA request (that is, each DMA request that passes the security checks and is permitted to execute) with the corresponding encryption key identifier. The encryption key identifier is used by a memory controller to select an encryption key for encrypting or decrypting data for the secure region 120.

It will be appreciated that, while the mapping table 109 is illustrated at FIG. 1 as a unified structure, in some embodiments one or more of the fields of the mapping table is stored in a different table. For example, in some embodiments the mapping table 109 represents two different table structures that are indexed using different information. One table stores the bound device information reflected by the VM identifier field 225 and the bound device field 226, and another table stores the assigned memory information reflected by the VM identifier field 225 and the assigned memory field 227. The IOMMU 110 indexes the first table using a device identifier, while the second table is indexed using the physical address associated with the DMA request.

Figure 3:
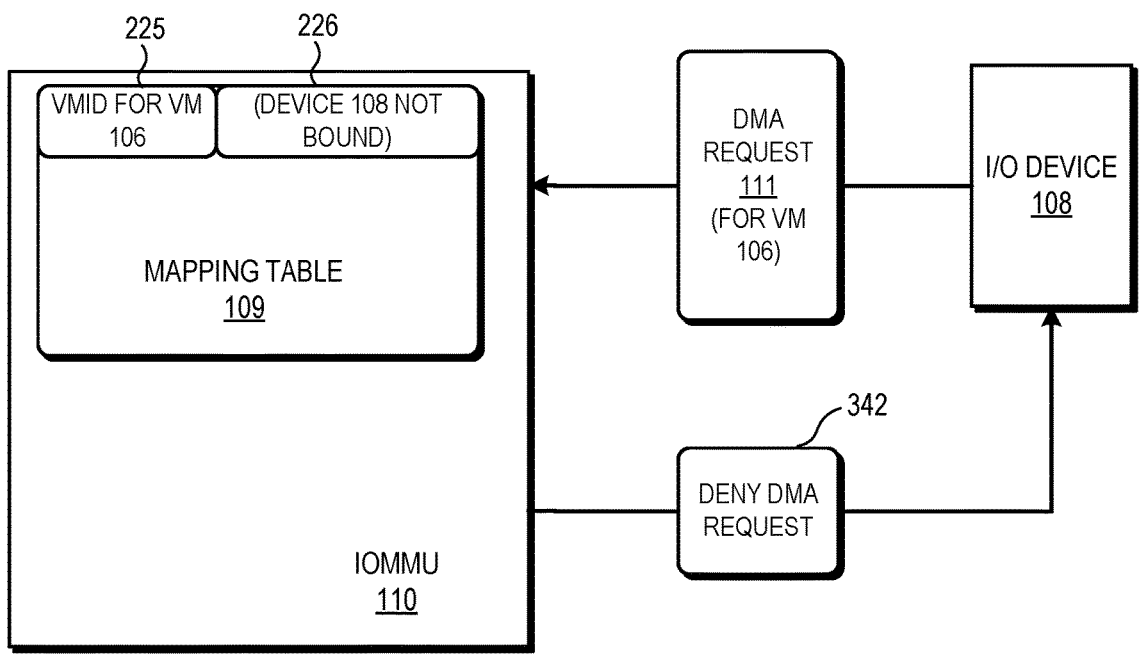
FIG. 3 is a block diagram illustrating an example of the IOMMU of FIG. 1 preventing execution of a DMA request associated with a virtual machine when the DMA request is issued by a non-bound I/O device in accordance with some embodiments.

FIG. 3 illustrates an example of the IOMMU 110 using the mapping table 109 to prevent execution of the DMA request 111 in accordance with some embodiments. In the illustrated example, the IOMMU 110 receives the DMA request 111 from the I/O device 108. The DMA request 111 includes a descriptor, as prepared by the I/O device 108, indicating that the DMA request 111 is associated with the TVM 106 (e.g., by including the VMID for TVM 106 in the descriptor). That is, the I/O device 108 indicates, via a field of the DMA request 111, that the request to read data, write data, or transfer (read and write) data, is on behalf of the TVM 106. The I/O device 108 also provides its own device ID in the DMA request 111, to indicate that the request was generated by the I/O device 108.

In response to receiving the DMA request 111, the IOMMU 110 accesses the mapping table 109, and in particular the entry of the mapping table 109 that corresponds to the TVM 106. For example, in some embodiments the IOMMU 110 employs the VMID indicated by the DMA request 111 to locate the entry of the mapping table 109 with the corresponding VMID in the VM identifier field 225. The IOMMU 110 then compares the device ID in the DMA request 111 with the device identifiers stored at the bound device field 226 of the entry of the mapping table 109. In the example of FIG. 3, it is assumed that the device ID for the I/O device 108 is not stored at the bound device field 226, indicating that the I/O device 108 has not been bound to the TVM 106 by the security module 104. In response to determining that device ID for the I/O device 108 is not stored at the bound device field 226, the IOMMU 110 prevents execution of the DMA request 111. For example, in some embodiments the IOMMU 110 prevents execution of the DMA request 111 by preventing use of the address mapping field 228 to translate the virtual addresses of the DMA request 111 to physical addresses. In addition, the IOMMU 110 provides a message 342 to the I/O device 108 indicating that the DMA request 111 is denied. In some embodiments, the IOMMU 110 also provides the message 342 (or a similar message) to the TVM 106. In some embodiments, the IOMMU 110 also notifies the security module 104 that the DMA request 111 has been denied, and that there has been a potential attempt at a security breach by the I/O device 108. This allows the security module 104 to take remedial action, such as notifying a system administrator of the potential security breach.

Figure 4:
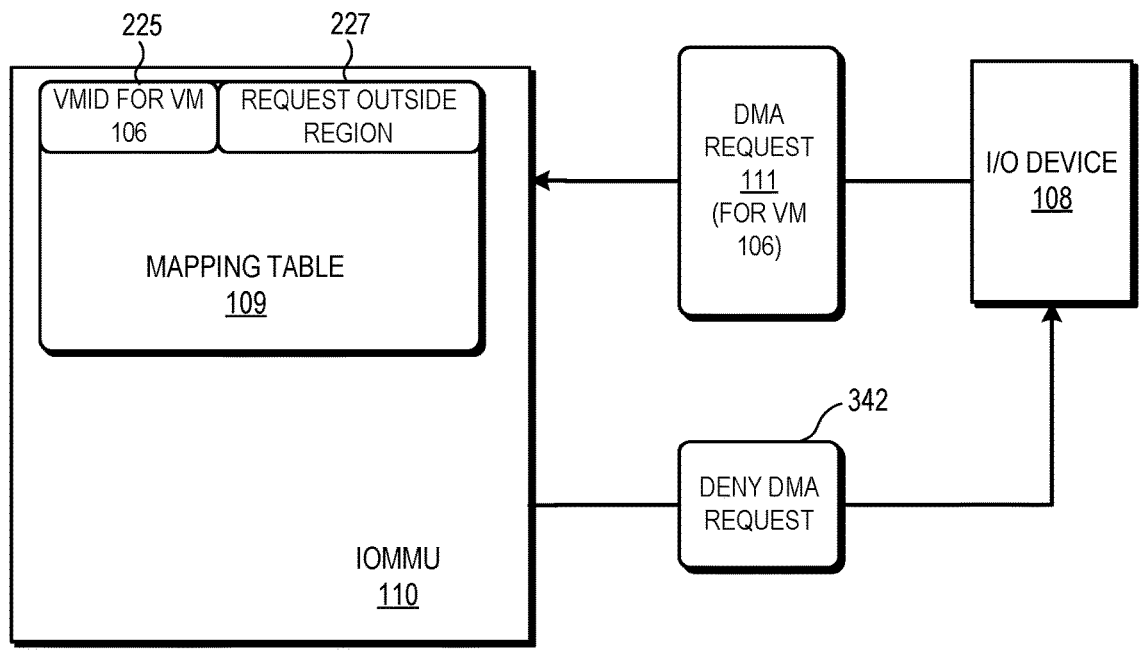
FIG. 4 is a block diagram illustrating an example of the IOMMU of FIG. 1 preventing execution of a DMA request associated with a virtual machine when the DMA request is targeted to memory outside of a specified range in accordance with some embodiments.

FIG. 4 illustrates another example of the IOMMU 110 using the mapping table 109 to prevent execution of the DMA request 111 in accordance with some embodiments. In the illustrated example, similar to FIG. 3, the IOMMU 110 receives the DMA request 111 from the I/O device 108. The DMA request 111 includes a descriptor, as prepared by the I/O device 108, indicating the portion of the memory 103 that is targeted by the DMA request. That is, the I/O device 108 indicates, via a field of the DMA request 111, the memory addresses targeted by the request to read data, write data, or transfer (read and write) data, is on behalf of the TVM 106.

In response to receiving the DMA request 111, the IOMMU 110 accesses the mapping table 109, and in particular the entry of the mapping table 109 that corresponds to the TVM 106. The IOMMU 110 then compares the memory portion indicated by the DMA request 111 with the memory portion indicated by the assigned memory field 227 of the entry of the mapping table 109. In the example of FIG. 3, it is assumed that the memory portion indicated by the DMA request 111 falls at least partially outside the memory portion stored at the assigned memory field 227. That is, the DMA request 111 at least partially targets a portion of the memory 103 that has not been assigned to the TVM 106. In response, the IOMMU 110 prevents execution of the DMA request 111 and notifies the security module 104 that the DMA request 111 has been denied by sending a message 342.

As noted above, in some embodiments the information represented by the mapping table 109 is stored in multiple different tables, that are differently indexed. For example, in some embodiments a first table (referred to as a source validation table) stores the VM identifier field 225 and corresponding bound device field 226 for each TVM, and a second table (referred to as a memory ownership table) stores the assigned memory field 227 and corresponding VM identifier field 225. The IOMMU 110 receives a DMA request from an I/O device, wherein the DMA request includes a device identifier for the I/O device and a virtual address targeted by the DMA request. The IOMMU 110 accesses the source validation table to determine if the I/O device is bound to the TVM, if not, the IOMMU 110 does not execute the request.

If the I/O device is bound to the TVM, the IOMMU 110 translates the virtual address to a physical address using a set of page tables. The IOMMU 110 uses the physical address to index the memory ownership table and compares the resulting VM identifier from the memory ownership table to the VM indicated by the source validation table. If the VM identifiers do not match, the IOMMU 110 does not execute the DMA request. If the VM identifiers match, the IOMMU 110 executes the DMA request.

Figure 5:
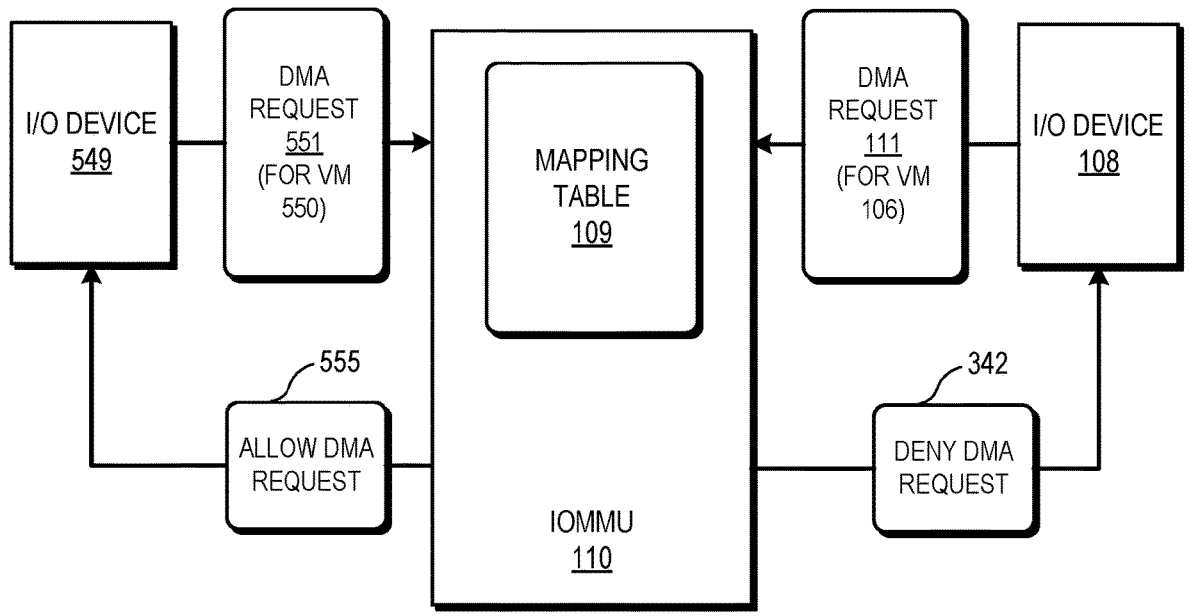
FIG. 5 is a block diagram illustrating an example of the IOMMU of FIG. 1 managing DMA accesses for multiple virtual machines in accordance with some embodiments.

As noted above, the mapping table 109 stores individual entries for each VM that is executing at the processor 101. This allows the IOMMU 110 to allow or deny DMA requests for different VMs on an individual basis, independent of the DMA requests for other VMs. An example is illustrated at FIG. 5 in accordance with some embodiments. For the example of FIG. 5, it is assumed that the processor 101 is executing two different VMs: the TVM 106 and a VM 550. The IOMMU 110 receives the DMA request 111 from the I/O device 108, indicating a request to access memory on behalf of the TVM 106. It is further assumed that the mapping table 109 indicates that the I/O device 108 is not bound to the TVM 106, that the DMA request 111 targets a portion of the memory 103 that has not been assigned to the TVM 106, or both. Accordingly, the IOMMU 110 prevents execution of the DMA request 111 and indicates (via the message 342) that the DMA request 111 has been denied.

With respect to the DMA request 551, it is assumed that the mapping table 109 indicates that the I/O device 549 is bound to the VM 550. It is further assumed that the mapping table 109 indicates that the DMA request 551 targets a portion of the memory 103 that has been assigned to the VM 550. Accordingly, the IOMMU determines that the DMA request 551 is allowed (as indicated by a message 555), and therefore executes the DMA request 551. Thus, in the example of FIG. 5, the IOMMU 110 selectively allows some DMA requests and denies others, thus preventing a malicious actor from halting or slowing execution of multiple VMs at the processing system 100 by issuing an improper DMA request.

Figure 6:
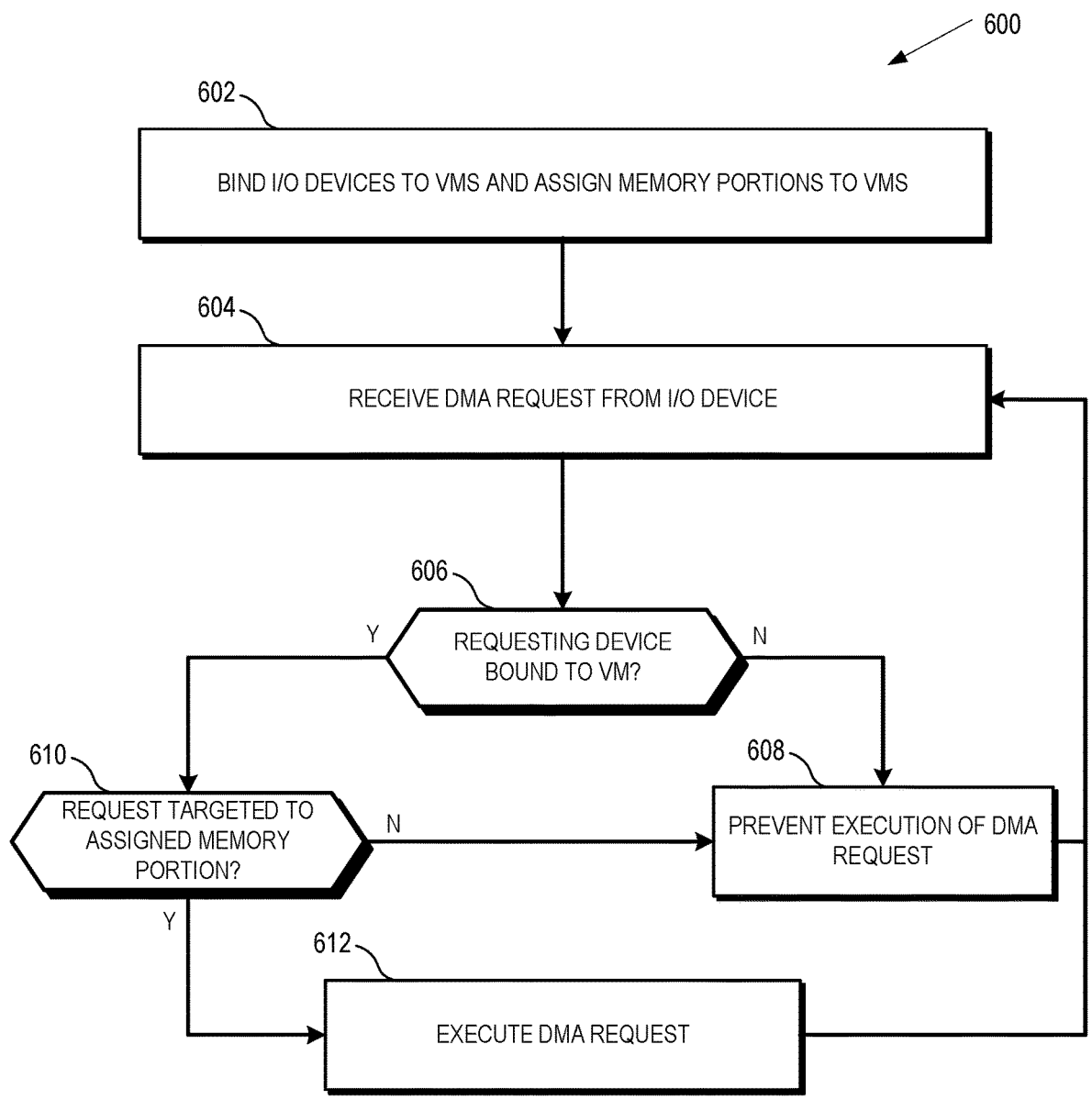
FIG. 6 is a flow diagram of a method of managing secure DMA accesses at an IOMMU in accordance with some embodiments.

FIG. 6 illustrates a flow diagram of a method 600 of managing secure DMA accesses at an IOMMU in accordance with some embodiments. For purposes of description, the method 600 is described with respect to an example implementation at the processing system 100 of FIG. 1, but it will be appreciated that in other embodiments the method 600 is implemented at processing systems having different configurations. At block 602, the security module 104 binds one or more I/O devices to the TVM 106 according to a specified security process, such as a Trusted Execution Environment (TEE) Device Interface Secure Protocol (TDISP) process. For example, in some embodiments the processing system 100 includes a communication fabric (not shown) that complies with a Peripheral Component Interconnect Express (PCIe) communication protocol. In particular, I/O devices such as I/O device 108, are configured to communicate with the processor 101, and the IOMMU 110, according to the PCIe communication protocol. In some embodiments, the PCIe communication protocol establishes a TDISP security registration process for binding I/O devices to VMs, and the security module 104 uses the TDISP security registration process to bind I/O devices to executing VMs. In addition, at block 602 the security module 104 assigns memory regions (also referred to as portions) to respective executing VMs. The security module 104 programs the mapping table 109 to store indications of the I/O devices bound to each VM, and the memory regions assigned to each VM.

At block 604, the IOMMU 110 receives the DMA request 111 from the I/O device 108. The DMA request 111 includes an identifier of the VM associated with the request and address information indicating the portion of the memory 103 targeted by the request. At block 606, the IOMMU 110 determines whether the VM associated the DMA request 111 is bound to the I/O device 108. If not, the method flow moves to block 608 and the IOMMU 110 prevents execution of the DMA request 111. The method flow then returns to block 604.

If, at block 606, the IOMMU 110 determines that the VM associated with the DMA request 111 is bound to the I/O device 108, the method flow moves to block 610 and the IOMMU 110 determines whether the DMA request 111 targets a portion of the memory 103 that is assigned to the corresponding VM. If not, the method flow moves to block 608 and the IOMMU 110 prevents execution of the DMA request 111. If the DMA request 111 does target a portion of the memory 103 that is assigned to the corresponding VM, the method flow moves to block 612 and the IOMMU 110 executes the DMA request 111. The method flow then returns to block 604.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to receiving, from a hypervisor controlling scheduling of a plurality of virtual machines (VMs) for execution, a first direct memory access (DMA) request associated with a first virtual machine (VM) of the plurality of VMs, identifying whether the first VM is bound to the hypervisor by a specified security registration process; and
   preventing, at an input/output memory management unit (IOMMU) of a processor executing the hypervisor, execution of the first DMA request responsive to identifying that the hypervisor is not bound to the first VM.

2. The method of claim 1, further comprising:
   in response to receiving, from a second device, a second DMA request associated with the first VM, identifying whether the first VM is bound to the second device by the specified security registration process; and
   executing, at the IOMMU, the second DMA request responsive to identifying that the second device is bound to the first VM.

3. The method of claim 1, further comprising:
   in response to receiving the first DMA request, preventing execution of the first DMA request responsive to determining that the first DMA request targets a first region of memory outside a region of memory assigned to the first VM.

4. The method of claim 3, further comprising:
   determining the region of memory assigned to the first VM based on a mapping table mapping virtual addresses associated with the first VM to physical addresses.

5. The method of claim 4, further comprising:
   identifying, based on the mapping table, an encryption key associated with the first VM.

6. The method of claim 4, further comprising:
   generating the mapping table at a security coprocessor.

7. The method of claim 1, wherein the specified security registration process comprises a Trusted Execution Environment (TEE) Device Interface Security Protocol (TDISP) registration process.

8. A method comprising:
   in response to verifying that a first virtual machine (VM) is a trusted VM via a device binding process that binds a hypervisor to the first VM, assigning a region of memory to the first VM, the first VM being one of a plurality of VMs scheduled by the hypervisor;
   in response to receiving, from the hypervisor, a first direct memory access (DMA) request associated with the first VM, identifying whether the first DMA request is targeted to the region of memory assigned to the first VM; and
   preventing, at an input/output memory management unit (IOMMU), execution of the first DMA request responsive to identifying that the first DMA request is targeted to a portion of memory outside the region of memory assigned to the first VM.

9. The method of claim 8, further comprising:
   in response to receiving, from a second device, a second DMA request associated with the first VM, identifying whether the second DMA request is targeted to the region of memory assigned to the first VM; and executing, at the IOMMU, the second DMA request responsive to identifying that the second DMA request is targeted to the region of memory assigned to the first VM.

10. The method of claim 9, further comprising:
in response to receiving a third DMA request associated with the first VM, approving execution of the third DMA request responsive to determining that the first VM is bound to the hypervisor by the device binding process, wherein the device binding process is a specified security registration process.

11. The method of claim 10, further comprising:
executing the device binding process for the first VM at a security coprocessor of a processor configured to execute the first VM.

12. The method of claim 8, further comprising:
determining the region of memory assigned to the first VM based on a mapping table mapping virtual addresses associated with the first VM to physical addresses.

13. The method of claim 8, further comprising:
in response to receiving, from a second device, a second DMA request associated with a second virtual machine (VM), identifying whether the second DMA request is targeted to a region of memory assigned to the second VM; and
preventing, by the IOMMU, execution of the second DMA request responsive to identifying that the second DMA request is targeted to a portion of memory outside the region of memory assigned to the second VM.

14. A processor comprising:
a processor core configured to execute tasks on behalf of a plurality of virtual machines (VMs) and to execute a hypervisor that is to control scheduling of the plurality of VMs for execution; and
an input/output memory management unit (IOMMU) separate from the processor core and configured to:
in response to receiving from the hypervisor a first direct memory access (DMA) request associated with a first VM of the plurality of VMs, identify whether the first VM is bound to the hypervisor by a specified security registration process; and
prior to the first DMA request being sent to the processor core, preventing execution of the first DMA request responsive to identifying that the hypervisor is not bound to the first VM.

15. The processor of claim 14, wherein the IOMMU is configured to:
in response to receiving, from a device, a second DMA request associated with the first VM, identify whether the first VM is bound to the device by the specified security registration process; and
execute the second DMA request responsive to identifying that the device is bound to the first VM.

16. The processor of claim 14, wherein the IOMMU is configured to:
in response to receiving the first DMA request, prevent execution of the first DMA request responsive to determining that the first DMA request targets a first region of memory outside a region of memory assigned to the first VM.

17. The processor of claim 14, wherein the IOMMU is configured to:
in response to receiving, from a device, a second DMA request associated with a second VM, identify whether the second VM is bound to the device by the specified security registration process; and
execute the second DMA request responsive to identifying that the device is bound to the first VM.

18. The processor of claim 17, wherein the IOMMU is configured to:
execute the second DMA request in response to determining that the second DMA request targets a second region of memory within a region of memory assigned to the second VM.

* * * * *